3,104,214
IRRADIATED POLYMERS
Gaetano F. D'Alelio, South Bend, Ind., assignor, by direct and mesne assignments, to Dal Mon Research Co., Cleveland, Ohio, a corporation of Delaware
No Drawing. Filed Nov. 14, 1957, Ser. No. 696,312
19 Claims. (Cl. 204—154)

This invention relates to improvements in polymeric alkenyl aryl compounds, such as polystyrene. More specifically, it relates to the irradiation of such polymeric compounds in the presence of mono-chloropolyfluorocarbon compounds to produce self-extinguishing products thereby.

Various methods have been suggested for making products such as polystyrene fire-retardant or fire-resistant, or self-extinguishing. Materials such as antimony oxide, polyvinyl chloride, etc., have been added to polystyrene for this purpose. The use of highly chlorinated styrene as a monomer or comonomer, as well as the chlorination of polystyrene itself, have also been suggested. The products produced by these complicated or expensive methods have not been satisfactory.

Attempts to introduce chlorine into polystyrene by irradiation in the presence of various chlorine containing substances, has resulted in the production of crosslinked resins which are insoluble and infusible and of little use for molding purposes. For exmple, irradiation of polystyrene in the presence of methylene dichloride produces insoluble, infusible crosslinked polystyrene.

A simple, efficient and inexpensive method for preparing fusible, soluble, self-extinguishing polymeric alkenyl aryl resins has now been found. By the practice of the present invention, such resins are produced by the irradiation of polymeric alkenyl aryl compounds contained in dilute solution with monochloro-polyfluoro compounds of the formula $$Cl-\underset{\underset{Y}{|}}{\overset{\overset{X}{|}}{C}}-C_nF_{2n+1}$$

wherein X and Y are respectively fluorine or another $C_nF_{2n+1}$ group, and $n$ can be 0 or any integer. The products obtained thereby contain a high percentage of chlorine and fluorine, are self-extinguishing, and are soluble and thermoplastic. This is believed to be caused by the addition of chlorine and/or polyfluoroalkyl groups to the polymers. 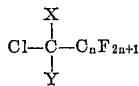

In the monochloro-polyfluoro compounds of the above formula, the value of $n$ has no upper limit since polymers of unlimited molecular weight can be used in the practice of this invention, for example polymers of tetrafluoroethylene in which one chlorine atom has been substituted on a carbon atom of the polymer. Obviously, however, the number of molecules of such high molecular weight polymers which may be added to the polymeric alkenyl aryl compounds is reduced since the proportion of halogen in the aryl polymer required to give fire-resistant properties is approached with a fewer number of molecules. As the molecular weight of the monochloro-polyfluoro compound is decreased, the greater is the number of such molecules required to be substituted on the aryl polymer in order to reach the proportion of halogen desired for fire-resistant properties. Furthermore, a lower molecular weight chloro-polyfluoro compound is desirable where it is preferred to have the chloro and polyfluoro groups more uniformly distributed along the polymer chain of the aryl compound.

Where the chloro-polyfluoro compound is a liquid, it is generally advantageous to have that compound serve as the solvent in which the aryl polymer is dissolved. In cases where the chloro-polyfluoro compound is a solid, such as with the resins mentioned above, or in cases where the compound does not have sufficient solvent activity for the aryl polymers, a mutual solvent can be employed, preferably one which has little or no reactivity with respect to the chloro-polyfluoro compound before or during irradiation. Such mutual solvents are those which can be easily removed after the irradiation by any simple step such as vaporization thereof, or by precipitation of the polymer product therefrom. In some cases, there is no objection to having part of the solvent react and possibly become attached to the polymer product in the course of the irradiaiton, provided that such addition or attachment of the solvent does not produce properties in the polymer product which would be undesirable for its ultimate use.

When using chloro-polyfluoro compounds of a solid or non-solvent type, however, it is often most convenient to mill the chloro-polyfluoro compound with the aryl polymer, such as on a Banbury mixer, to give a substantially uniform mixture which can be irradiated as such. It is also possible and in some cases desirable to use as the solvent the lower molecular weight chloro-polyfluoro compounds disclosed herein to act as solvent and also to participate in the reaction and thereby enhance the self-extinguishing properties which are being imparted to the aryl polymer. In some cases, solvents, such as aromatic solvents can be used which will produce products by irradiation thereof together with the chloro-polyfluoro compounds to give low molecular weight products which in some cases can be removed by vaporization, or which can be left in the polymer product to act as plasticizers, lubricants, and by virtue of the high fluorine content therein, to enhance the firse-resistant properties.

In cases where the chloro-polyfluoro compounds are gases or highly vaporous, the gas and the aryl polymer can both be dissolved in a solvent. Sealed metal containers are also advantageously used to sustain the pressure and the reaction mixture can be cooled before irradiation. Solvents which can be used advantageously for the aryl polymer and the various chloro-polyfluoro compounds are advantageously of the aliphatic type, such as heptane, hexane, petroleum ether, etc., so as to avoid reaction between the solvent and halogen compound during irradiation.

Examples of chloro-polyfluoro compounds which can be used in the practice of this invention, either individually or in various combinations thereof include: chloro-trifluoro-methane or chloro-carbontrifluoride, chloropentafluoro-methane, 1-chloro-heptafluoro-propane, 2-chloro-heptafluoro-propane, 1-chloro-nonafluoro-n-butane, 1-chloro - 2 - trifluoromethyl - hexafluoro - propane, chloro-tris(trifluoro - methyl) - methane, 2-chloro-nonafluoro-n-butane, 1-chloro-n-$C_6F_{13}$, 3-chloro-n-$C_7F_{15}$, 3-chloro-3-(pentafluorethyl)-$C_8F_{15}$, 1-chloro-$C_{18}F_{37}$, 1-chloro-$C_{20}F_{41}$, etc. It is generally preferred that the fluorine be on a primary carbon atom, that is that, in the above general formula, X and Y be fluorine atoms.

In the practice of this invention, it is generally advantageous to use no more than about fifteen percent by weight of the polymeric alkenyl aryl compound in the mixture to be irradiatied, based on the combined weight of polymer and halide. When mutual solvents, diluents, plasticizers and other materials inert before and during irradiation are used in the mixtures, the above percentages are based on the combined weight of polymer and halide. However, with lower amounts of irradiation, more concentrated mixtures, for example up to thirty percent by weight of the polymer, can be used without producing an undesirable degree of crosslinking. Again, it is permissible to use higher irradiation doses when the polymer is present in very dilute mixtures. Although some addition is effected with as little as 1 megarep irradiation, it is generally advantageous to apply irradiation doses to 5 to 100 megareps, or more, depending somewhat on the concentration of the polymer in the mixture and the degree of addition to be effected.

The invention can be practiced on very dilute solutions of polymer but for obvious economic reasons based on cost of recovery, size of equipment, etc., there would be no practical reason for using solutions containing less than one percent by weight of polymer. For similar economic reasons, it is generally desirable to use as high a concentration of polymer as possible with other factors adjusted where possible to avoid crosslinking.

While for many purposes in which the ultimate product is to be used for the production of shaped articles, it is generally desirable to use polymeric alkenyl aryl compounds having molecular weights of 6,000, advantageously 10,000 or greater, the products produced by the practice of this invention on polymers of lower molecular weight can be used as fillers, impregnants, or modifiers in various compositions, such as resins, etc., to improve their fire-retardant properties.

The mixture to be irradiated can be in a container made of a material such as aluminum, Pyrex, glass, quartz, stainless steel, etc., which will not substantially interfere with the irradiation. It is often advantageous to avoid oxidation or side reactions by the use of an inert atmosphere such as nitrogen. Moreover, it is advantageous to prevent the temperature from approaching that at which the polymer or the carbon tetrachloride is unstable. This can be accomplished by cooling the solution before irradiation or by dissipating the heat generated during irradiation. The irradiated product can be recovered from the reaction solution by vaporization of the solvent either at normal or reduced pressure.

The products produced by the practice of this invention, such as self-extinguishing polystyrene, can be used for a number of purposes. For example, lacquers made from these give fire-retardant or fire-resistant protective coatings. Such compositions can even be fortified with antimony oxide. Paper and cloth can be impregnated with these products to give fire-resistant products. Insulating and water-buoyant foamed products can be made from polystyrene irradiated in accordance with the practice of this invention, either as such with an expanding agent of the petroleum ether type or in mixtures with antimony oxide and/or ordinary polystyrene.

Aryl compounds from which the polymeric alkenyl aryl compounds can be prepared for use in the practice of this invention also include those having attached to the aryl nucleus, in addition to the vinyl groups specified above, various other substituent groups such as alkyl, cycloalkyl, aryl, alkoxy, aryloxy, chloro, bromo, fluoro, carbalkoxy, acyloxy, cyano, etc., provided such groups do not interfere with the irradiation or with the ultimate purpose to which the product is to be applied.

Examples of suitable polymerizable aryl compounds are: styrene, alpha-methyl-styrene, alpha-ethyl-styrene, nuclear-substituted chloro-styrenes, i.e., ortho-, meta-, and para-chloro-styrenes, dichlorostyrenes, for example, the 2,3-, 2,4-, 2,5-, 2,6-, 3,4,, and 3,5-dichlorostyrenes, trichloro-styrenes; cyano styrenes, such as ortho-, meta-, and para-cyano-styrenes, dicyano-styrenes; nuclear-substituted alkyl-styrenes, such as mono- and dimethyl-styrenes, mono- and diethyl-styrenes, mono- and di-isopropyl-styrenes; aryl-substituted styrenes, i.e., ortho-, meta-, and para-phenyl styrenes, and derivatives thereof, etc.; cycloalphatic substituted styrenes, such as para-cyclohexyl-styrene, fluoro-styrenes, such as ortho-, meta-, para - fluoro - styrene, difluoro - styrenes, etc., trifluoromethyl-styrenes, such as ortho-, meta-, and para-trifluoromethyl-styrenes, di-(trifluoromethyl)-styrenes, p-bromostyrene, p-acetoxy-styrene, p-phenoxy-styrene, methyl p-vinyl-benzoate, vinyl naphthalenes and their derivatives such as vinyl chloro-naphthalene, vinyl methyl-naphthalene, vinyl ethyl-naphthalene, vinyl acetoxy naphthalene, isopropenyl naphthalene, alpha-ethy-vinyl naphthalene, isopropenyl-diphenyl, alpha-ethyl-vinyl-diphenyl, vinyl carbazole, etc. In addition to homopolymers of such alkenyl aryl compounds, any 2, 3, 4 or more of such compounds can be copolymerized or any such compound can be copolymerized with other ethylenic copolymerizable monomers for producing polymers suitable in the practice of this invention, provided the major part of the copolymer is derived from one or more alkenyl aryl compounds.

The polymers of these aryl compounds can be prepared by various well-known polymerization methods, such as emulsion, suspension, mass and solution polymerizations using thermal or various catalytic systems. For example, there may be used as catalysts peroxides, such as benzoyl peroxide, naphthyl peroxides, phthalyl peroxide, tertiary-butyl perbenzoate, etc., azo-catalysts, persulfates, such as ammonium persulfate, etc., metal alkyl catalysts, such as aluminum alkyls, i.e., aluminum triethyl, etc. The polymerization systems can contain various other substances, such as solvents, suspension or emulsion media, emulsifying agents, suspension agents, plasticizers, lubricants, etc.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of peneration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example cobalt 60.

Various types of high power electron linear accelerators are commercially available, for example from Applied Radiation Corporation, Walnut Creek, California. In the following Example I, ARCO type travelling wave accelerator, model Mark I, operating at 3 to 10 million electron volts, was used to supply the irradiation. Other type of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual," edited by Theodore Rockwell III and published by D. Van Nostrand Company, Inc., 1st edition, 1956, as that radiation dosage which produces energy absorption in human tissue equal to 93 ergs per gram of tissue.

In the practice of this invention, changes in properties of the polymeric materials can often be noted after treatment with even less than 1 megarep. However, it is generally advantageous to use doses of 2 megareps or more. The degree of change in properties is dependent somewhat on the dosage, greater changes being effected by increasing the dosage.

The polymer material to be treated is often advantageously irradiated while in a container made of a material such as aluminum or glass which will not substantially interfere with the irradiation. It is advantageous also to use polymeric materials, such as polyethylene, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is often advantageous to avoid oxidation or side reactions by the use of an inert atmosphere such as nitrogen. Moreover, it is advantageous to prevent the temperature from approaching that at which the polymer material is unstable. This can be accomplished by cooling the polymer material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise, the terms "polymers" and "polymeric" are intended to include "copolymers" and "copolymeric." Molecular weights given herein are Staudinger molecular weights.

*Example I*

A solution is prepared containing one part of polystyrene resin and fifteen parts of 1-chloro-nonafluoro-butane. The solution, which is clear and colorless, is placed in a stainless steel container, sealed and exposed to 25 megareps of irradiation supplied by the above-mentioned ARCO type travelling wave accelerator, Model Mark I. After irradiation unreacted solvent is vaporized off the resin product. When tested for burning properties the resin is found to be self-extinguishing.

*Example II*

The procedure of Example I is repeated a number of times using one part of resin, with the type of resin, the irradiation dosage, and with the results all as indicated in the table below. The following list gives the type and amount of chloro-trifluoro compound, together with the type and amount of mutual solvent, if any is used, for each experiment. The letter in the table indicates that the corresponding halogen compound composition was used as appears opposite the letter in this list.

A—3 parts chloro-trifluoromethane plus 15 parts heptane.
B—5 parts 1-chloro-heptafluoro-propane plus 10 parts heptane.
C—5 parts 2-chloro-heptafluoro-propane plus 10 parts heptane.
D—10 parts 1-chloro-2-(trifluoromethyl)-hexafluoro-propane plus 5 parts hexane.
E—15 parts 1-chloro-n-$C_5F_{11}$.
F—100 parts 1-chloro-nonafluoro-butane plus petroleum ether having boiling range 40–65° C.
G—20 parts 1-chloro-$C_{20}F_{41}$.

| Resin from— | Halogen compound composition | Megareps | Burning test |
|---|---|---|---|
| Vinyl naphthalene | A | 30 | Self-extinguishing. |
| Vinyl toluene | B | 10 | Do. |
| Chlorostyrene | C | 5 | Do. |
| Vinyl diphenyl | D | 30 | Do. |
| Ethyl styrene | E | 100 | Do. |
| p-acetoxy-styrene | F | 50 | Do. |
| p-Cyano styrene | G | 35 | Do. |
| p-Methoxy styrene | E | 25 | Do. |
| p-Vinyl/methyl benzoate | A | 40 | Do. |
| Styrene-alpha-methyl styrene (80–20) | B | 35 | Do. |
| Styrene-ethyl acrylate (70—30) | C | 25 | Do. |
| Styrene-acrylonitrile (80–20) | D | 25 | Do. |
| Styrene-vinyl naphthalene (60–40) | E | 35 | Do. |

*Example III*

Polystyrene product derived according to the procedure of Example I is powdered and then pelletized to approximately 10 mesh size. Together with 770 parts of water, 4.5 parts of finely divided hydroxy apatite and 0.05 part sodium dodecyl benzene sulfonate, 190 parts of these pellets are placed in a vessel equipped for pressure, stirring and heating. Petroleum ether (21.3 parts) boiling in the range of 35–85° C. is added, the vessel is closed, stirring is started and the temperature is raised over a period of about 1½ hours, to 90° C. and held there for approximately 4 hours. The suspension is then cooled and then acidified with hydrochloric acid to a pH of about 2. The product is centrifuged and pellets washed with cold water. The petroleum ether-containing beads are then placed in a mold having vent means therein so as to occupy about 8 percent of the mold space, the mold closed and steam introduced therein. After 10 minutes, the steam addition is discontinued, the mold opened and the cellular resin product removed. This is tested for burning properties and is found to be self-extinguishing.

Example IV

The procedure of Example III is repeated using 3 percent by weight antimony oxide, 75 percent regular polystyrene, and 25 percent of the product derived according to Example I. The foamed product shows similar self-extinguishing properties.

Example V

The procedure of Example I is repeated five times using in each case the same irradiation dosage as in Example I, but comprising a different type or source of irradiation as follows: X-rays, gamma rays, neutron radiation from bombarded beryllium, radiation from radioactive cobalt 60, and radiation from a Van de Graaff generator. In each case similar improvement in properties is noted.

Compositions made according to the practice of this invention can also contain various agents such as plasticizers, lubricants, coloring agents, such as dyes and pigments, fillers, etc. Suitable fillers are silica, silica aerogel, titanium dioxide, calcium silicate, ferric oxide, chromic oxide, cadmium sulfide, asbestos, glass fibers, calcium carbonate, carbon black, lithopone, talc, etc. These can be added by various well-known means, such as milling, etc. Moreover, the compositions of this invention can contain or be mixed with various other types of resins, such as polystyrene, polymethyl methacrylate, nylon, polyacrylonitrile, polyvinyl acetate, etc. to modify or impart various properties thereto, particularly fire-resistant properties.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for producing polymeric compositions of improved fire-resistance comprising the treatment of a chloro-polyfluoro composition having dissolved therein about 1 to 30 percent by weight, based on the combined weight of polymer and chloro-polyfluoro compound, of a polymer of a polymerizable aryl compound having an alkenyl group on the aryl nucleus thereof selected from the class consisting of vinyl, alpha-methyl-vinyl, and alpha-ethyl-vinyl groups, and a chloro-polyfluoro compound having the formula $$Cl-\underset{\underset{C_nF_{2n+1}}{|}}{\overset{\overset{C_nF_{2n+1}}{|}}{C}}-C_nF_{2n+1}$$

wherein $n$ is a value from 0 to any integer with about 1 to about 100 megareps of irradiation derived from an energy source of at least about 100,000 electron volts, said irradiation treatment being effected while said composition is substantially free from contact with free oxygen.

2. A process of claim 1, in which the said polymerizable aryl compound is a vinyl aryl compound.

3. A process of claim 1, in which the said polymerizable aryl compound is styrene.

4. A process of claim 1, in which said polymerizable aryl compound is vinyl toluene.

5. A process of claim 1, in which said polymer is a copolymer comprising a major part of vinyl aryl compound.

6. A process of claim 5, in which said vinyl aryl compound is styrene.

7. A process of claim 5, in which the copolymer is a styrene-alpha-methyl-styrene copolymer.

8. A process of claim 1, in which said chloro-polyfluoro compound contains no more than 20 carbon atoms.

9. A process of claim 1, in which said chloro-polyfluoro compound is 1-chloro-nonafluoro-butane.

10. A process of claim 9, in which said polymer is a polymer of styrene.

11. A process of claim 10, in which said polymer is a heteropolymer of styrene.

12. A process of claim 11, in which said composition contains about 1 to 15 percent by weight of said polymer.

13. A process of claim 1, in which said composition contains aobut 1 to about 15 percent by weight of said polymer.

14. A process for producing polymeric compositions of improved fire-resistance comprising the treatment of a chloro-polyfluoro composition having dissolved therein about 1 to 30 percent by weight, based on the combined weight of polymer and chloro-polyfluoro compound, of a polymer of a polymerizable aryl compound having an alkenyl group on the aryl nucleus thereof selected from the class consisting of vinyl, alpha-methyl-vinyl, and alpha-ethyl-vinyl groups, and a chloro-polyfluoro compound having the formula $$Cl-\underset{\underset{C_nF_{2n+1}}{|}}{\overset{\overset{C_nF_{2n+1}}{|}}{C}}-C_nF_{2n+1}$$

wherein $n$ is a value from 0 to any integer, with about 1 to 100 megareps of irradiation derived from an energy source of at least about 100,000 electron volts, said irradiation treatment being effected while said composition is substantially free from contact with free oxygen, and subsequently recovering halogenated polymer from said composition.

15. A process of claim 14 in which said polymerizable aryl compound is a vinyl aryl compound.

16. A process of claim 14 in which said polymerizable aryl compound is styrene.

17. A process for producing polymeric compositions of improved fire-resistance comprising the treatment of a chloro-polyfluoro composition having dissolved therein about 1 to 30 percent by weight, based on the combined weight of polymer and chloro-polyfluoro compound, of a polymer of a polymerizable aryl compound having an alkenyl group on the aryl nucleus thereof selected from the class consisting of vinyl, alpha-methyl-vinyl, and alpha-ethyl-vinyl groups, and a chloro-polyfluoro compound having the formula $$Cl-\underset{\underset{C_nF_{2n+1}}{|}}{\overset{\overset{C_nF_{2n+1}}{|}}{C}}-C_nF_{2n+1}$$

wherein $n$ is a value from 0 to any integer, with about 1 to 100 megareps of irradiation derived from an energy source of at least about 100,000 electron volts, said irradiation treatment being effected while said composition is substantially free from contact with free oxygen, and subsequently expanding the polymeric product to a cellular form.

18. A process of claim 17 in which said polymerizable aryl compound is styrene.

19. A process for producing polymeric compositions of improved fire-resistance comprising the treatment of a chloro-polyfluoro composition having dissolved therein about 1 to 30 percent by weight, based on the combined weight of polymer and chloro-polyfluoro compound, of a polymer of a polymerizable aryl compound having an alkenyl group on the aryl nucleus thereof selected from the class consisting of vinyl, alpha-methyl-vinyl, and alpha-ethyl-vinyl groups, and a chloro-polyfluoro compound having the formula $$Cl-\underset{\underset{C_nF_{2n+1}}{|}}{\overset{\overset{C_nF_{2n+1}}{|}}{C}}-C_nF_{2n+1}$$

wherein $n$ is a value from 0 to any integer, with about 1 to 100 megareps of irradiation derived from an energy source of at least about 100,000 electron volts, said irradiation treatment being effected while said composition is substantially free from contact with free oxygen, and subsequently expanding said halogenated polymer to a cellular form.

References Cited in the file of this patent

UNITED STATES PATENTS

| | | |
|---|---|---|
| 2,481,188 | Babayan | Sept. 6, 1949 |
| 2,676,946 | McCurdy et al. | Apr. 27, 1954 |
| 2,694,702 | Jones | Nov. 16, 1954 |
| 2,823,201 | Wheaton | Feb. 11, 1958 |
| 2,943,988 | Canterino | July 5, 1960 |
| 2,952,594 | Rubens | Sept. 13, 1960 |
| 2,960,453 | Cook et al. | Nov. 15, 1960 |

FOREIGN PATENTS

| | | |
|---|---|---|
| 546,816 | Belgium | Oct. 6, 1956 |

OTHER REFERENCES

Wall et al.: "Modern Plastics," vol. 30, No. 11, pages 111, 112, 114, 116, 176, 178, July 1953.